No. 851,369. PATENTED APR. 23, 1907.
T. NELSON.
SNAP HOOK.
APPLICATION FILED JUNE 13, 1906.

Witnesses.
K. D. Kilgore.
A. H. Opsahl.

Inventor.
Tidemand Nelson,
By his Attorneys,
Williamson & Merchant

UNITED STATES PATENT OFFICE.

TIDEMAND NELSON, OF STARBUCK, MINNESOTA.

SNAP-HOOK.

No. 851,369.     Specification of Letters Patent.     Patented April 23, 1907.

Application filed June 13, 1906. Serial No. 321,472.

*To all whom it may concern:*

Be it known that I, TIDEMAND NELSON, a citizen of the United States, residing at Starbuck, in the county of Pope and State of Minnesota, have invented certain new and useful Improvements in Snap-Hooks; and I do hereby declare the following to be a full, clear, and exact description of the invention, such as will enable others skilled in the art to which it appertains to make and use the same.

My invention has for its object to provide an improved snap hook, and to this end it consists of the novel construction and combinations of parts hereinafter described and defined in the claims.

In the accompanying drawings which illustrate the invention, like characters indicate like parts throughout the several views.

Figure 1:
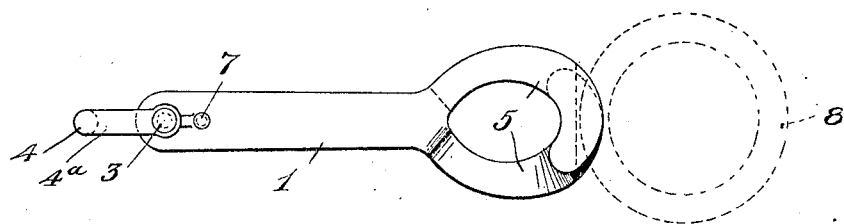
Figure 2:
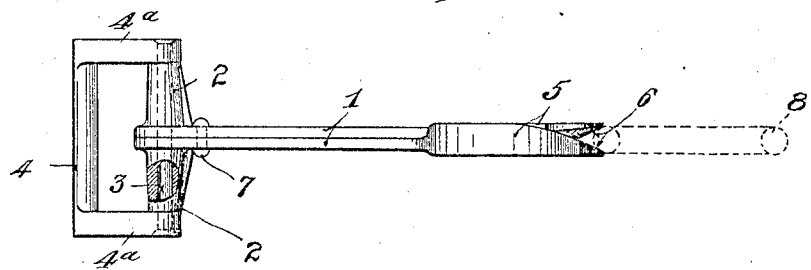

Referring to the drawings, Figure 1 is a plan view of the improved snap hook; and Fig. 2 is an edge elevation of the snap hook shown in Fig. 1.

The numeral 1 indicates separately formed spring arms which, at one end, are provided with hubs 2 that are connected by a rivet or bolt 3 to the lugs 4ª of the yoke 4, and at their other ends are formed with overlapping hooks 5. The hooks 5 are formed with diverging cam surfaces 6. A rivet 7 applied to the arms 1 close to the hubs 2 secure the said spring arms so that they can not be separately moved pivotally on the long rivet 3. The spring arms 1 are adapted to be sprung apart laterally to permit separation of the hooks 5 for the purpose of inserting between the said hooks the part to be coupled thereto, such as a ring 8, indicated by dotted lines in the drawings. To insert the ring between the hooks 5 it is placed edge wise in the same plane as the said hooks 5, and is formed against the cam surfaces 6 until it passes into the eye or opening formed by the hooks, and beyond the ends of the hooks; and it may then turn into a plane at a right angle to the said hooks, and is then locked to or held by the hook. To remove the ring, it is turned laterally against the hooks in the proper direction to force the hooks apart, and this being done, it may be withdrawn from between the hooks. It is evident, that when the ring is held by the hooks, any tensile or drawing strain thereon will have no tendency to open the hooks, but will, in fact, draw the hooks more tightly together.

The snap hook above described may be cheaply constructed; may be very quickly and easily operated; is strong and durable, and is generally efficient for the purposes had in view. It may, of course, be constructed in various sizes and used for various purposes.

What I claim is:

The combination with a yoke 4 and a bolt 3 connecting the lugs thereof, of a pair of spring arms 1 provided at one end with overlapping hooked portions 5 and provided at their other ends with hubs 2 applied on said bolt 3, the said arms being rigidly connected at or in the vicinity of the said hubs, substantially as described.

In testimony whereof I affix my signature in presence of two witnesses.

TIDEMAND NELSON.

Witnesses:
   GEO. W. NOYES,
   G. I. ENGEBRETSON.